United States Patent [19]

Sarin et al.

[11] Patent Number: 4,539,245

[45] Date of Patent: Sep. 3, 1985

[54] SOUND ATTENUATING STRUCTURE

[75] Inventors: Sohan L. Sarin, Hoofddorp; Teun Zandbergen, Emmeloord, both of Netherlands

[73] Assignee: Fokker B.V., Schiphol, Netherlands

[21] Appl. No.: 603,500

[22] Filed: Apr. 24, 1984

[51] Int. Cl.³ .............................................. B32B 3/12
[52] U.S. Cl. ..................................... 428/116; 52/806; 181/292; 428/138
[58] Field of Search ................ 428/73, 116, 117, 118, 428/131, 134, 138; 52/806; 181/292

[56] References Cited

U.S. PATENT DOCUMENTS

| | | | |
|---|---|---|---|
| 2,275,425 | 3/1942 | Grabec | 428/138 |
| 2,994,401 | 8/1961 | Bourn et al. | 428/131 X |
| 3,173,520 | 3/1965 | Fisher | 428/117 X |
| 3,713,921 | 1/1973 | Fleischer | 428/131 X |
| 3,822,762 | 7/1974 | Crispin et al. | 428/117 X |
| 3,948,346 | 4/1976 | Schindler | 428/116 X |
| 4,134,243 | 1/1979 | Fries | 428/116 X |
| 4,291,080 | 9/1981 | Ely et al. | 428/116 |
| 4,294,329 | 10/1981 | Rose et al. | 428/116 X |
| 4,379,191 | 4/1983 | Beggs et al. | 428/118 |

FOREIGN PATENT DOCUMENTS 966190 10/1982 U.S.S.R. ............................ 428/116

Primary Examiner—Henry F. Epstein
Attorney, Agent, or Firm—Handal & Morofsky

[57] ABSTRACT

Sound attenuating structure including a combination of one or more core layers comprising cells directed perpendicular to the main surface of the structure. The core layers are separated from each other by perforated separating sheets, a closed sheet is adhered to one side of said combination and a perforated sheet to the other side of said combination, at which side the sound waves impinge upon the structure. The passages in said last mentioned sheet as well as in the separating sheets have an asymmetric cross section having its smallest diameter somewhat less than the sheet thickness of the structure and increasing from this diameter fluently towards both surfaces of the respective sheet.

5 Claims, 5 Drawing Figures

SOUND ATTENUATING STRUCTURE

The invention relates to a sound attenuating structure including a core layer comprising cells directed perpendicular to the main surface of the structure, a closed sheet at one side of said core layer and a perforated sheet at the other side of said core layer, at which side the sound waves impinge upon the structure.

The invention relates further to a sound attenuating structure including a combination of a number of core layers comprising cells directed perpendicular to the main surface of the structure, which core layers are mutually separated by perforated separating sheets, a closed sheet at one side of said combination and a perforated sheet at the other side of said combination at which side the sound waves impinge upon the structure.

Examples of sound attenuating structures of this type are described in U.S. Pat. Nos. 4,291,080, 3,822,762 and 4,379,191. Sound attenuating structures of this type are frequently used in the outer casings of turbojet engines of modern civil aircraft for energy absorption of air oscillations or vibrations within a relatively small frequency band. In the known structures the passages in said one sheet are embodied in the form of a regular pattern of round cylindrical openings with a diameter of 1 to 2 mm. The attenuation quality of said structure is influenced by a large number of parameters. These parameters relate to the geometry of the combination of the (preferably honeycomb shaped) cells in the core layer or layers and the perforation openings in the separating sheets and/or in said one outer sheet, and to the contents of the frequency spectrum of air oscillations or vibrations as well as the speed of the air passing along said structure. Using such a structure in the inlet/exhaust of a turbojet engine a frequency range of 500–6000 Hz and sound pressures of approximately 160 dB have to be considered as well as an air speed along this structure of for instance Mach 0.15 to 0.8.

Experiments conducted into behavior of sound attenuating panels, positioned within channels as for instance the inlet passage of turbojet aircraft engines, have shown that the whole situation is very complex. An important parameter for the quality of a panel which is to be used as a noise attenuating panel is the acoustical resistance of said panel. Ideally the accoustical resistance is a constant value within a predetermined range of sound pressures and air speeds along the panel. In known structures with openings of from 1 to 2 mm the curve of the acoustical resistance is certainly not ideal. The so called non-linearity factor NLF for said structure is approximately equal to 10. The NLF is the ratio between the acoustical resistances at 200 cm/sec and 20 cm/sec.

According to the invention an improvement in the acoustical resistance curve in relation to a structure of the above mentioned type is realised in that the passages in said outer sheet and (if present) in the separating sheets have a cross section presenting a minimum somewhere within the sheet thickness of the structure and increasing from said minimum towards both surfaces of the respectieve sheet. Preferably said minimum is located within that half of the sheet thickness which is directed to the outside of the structure. Furthermore the passages are significantly smaller and the pattern of passages has a much smaller pitch between the passages. Preferably said passages have, viewed in the longitudinal direction, a symmetrical or asymmetrical double conical cross section with fluently embodied transitions as well as a number of passages per cm$^2$ in a range of from 2000 to 3000. Such a sheet has a porosity of 1 to 15%. The NLF of a structure of this type is approximately 2.

BRIEF DESCRIPTION OF THE DRAWINGS

The invention will now be explained in more detail with reference to the drawings.

Figure 1:
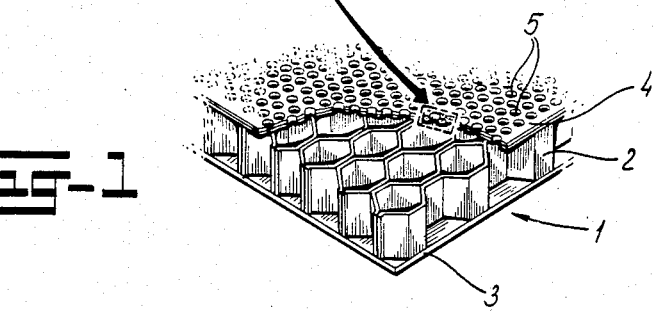
FIG. 1 illustrates a partly worked open perspective view of an acoustical panel known from the state of the art.

The panel 1 of FIG. 1 has a sandwich structure including a core 2 formed by a grid of honeycomb shaped cells positioned perpendicular to the surface of the structure. The walls of the cells in said honeycomb grid are closed at the under side and at the upper side by the respective sheets 3 and 4. The lower sheet 3 is a closed sheet and the upper sheet 4 has a series of passages. The thickness of the sheets 3 and 4 might be different; the necessary sheet thicknesses are strongly dependent onto the mechanical strength and stiffness requirements of the complete panel. The sheets 3 and 4 can be attached to the core 2 by means of bonding, welding or other suitable methods.

Figure 2:
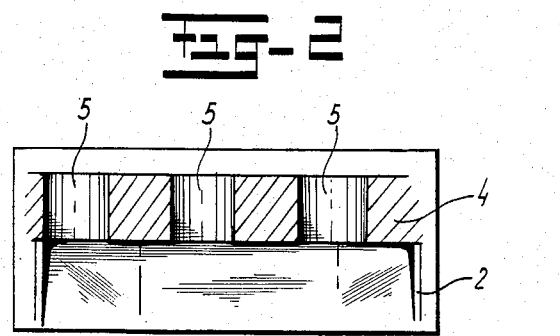
FIG. 2 illustrates a cross section especially through the perforated sheet belonging to the panel in FIG. 1.

FIG. 2 illustrates a partial cross section especially through the upper sheet 4 with the therein provided passages 5 which, as appears clearly from FIG. 2, have in general a cylindrical shape.

Figure 4:
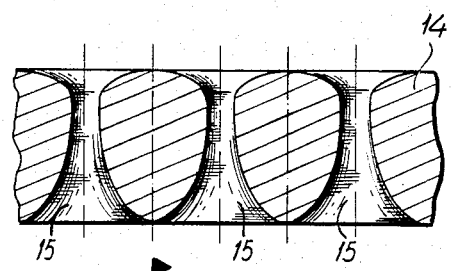
FIGS. 3 and 4 illustrate similar views as FIGS. 1 and 2, however of an embodiment of a structure according to the invention.
Figure 3:
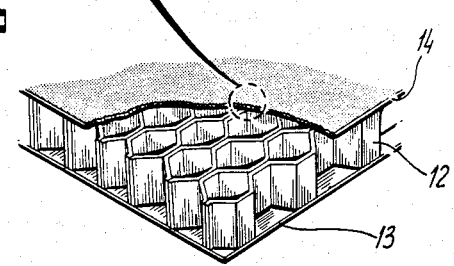

The panel according to the invention is illustrated in FIG. 3 and includes a core 12, a lower sheet 13 and an upper sheet 14. The essential difference between the invention and the prior art structure of FIGS. 1 and 2 is in the number of passages, the mutual thickness thereof and especially the shape of the passages 15 in the upper sheet 14, which shape is in more detail illustrated in FIG. 4. The passages 15 have a varying cross section of which the smallest diameter lies somewhere within the sheet thickness, preferably in that half of the sheet thickness directed to the outside of the structure, and from this smallest diameter the diameter of the passage increases fluently towards both sheets surfaces. In FIG. 4 the passages have, viewed in longitudinal direction, an asymmetrical diabolo shape. Within the scope of the invention, however, passages having other shapes are possible, for instance, a double conical shape with a fluently embodied passage and rounded transitions. Preferably an asymmetrical passage is used whereby the smallest diameter of the passage is positioned in that half of the sheet thickness directed to the outside (the side onto which the sound waves impinge).

Figure 5:
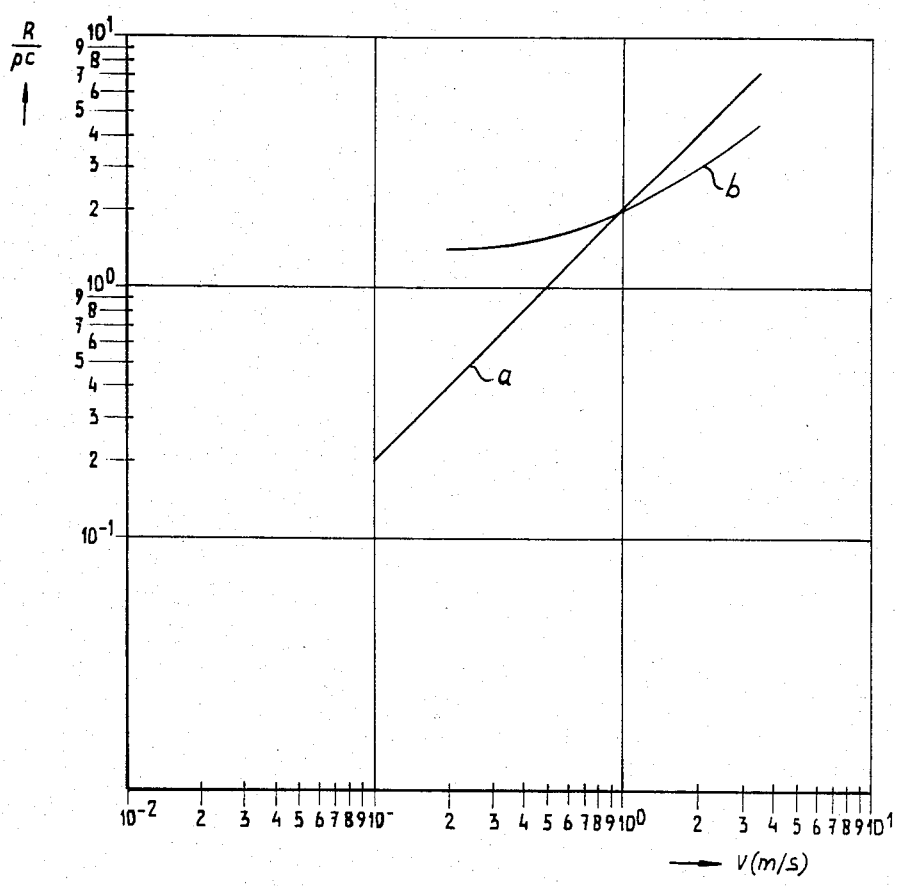
FIG. 5 illustrates graphically curves for the acoustical resistances of the panels shown in FIGS. 1 and 3.

FIG. 5 illustrates measurement results both for the panel of FIG. 1 as well as for the structure of FIG. 3. Along the horizontal axis the air transfer speed is plotted, that means the air speed in the direction perpendicular to the structure and measured at a relatively large distance from the structure. Along the vertical axis the factor $R/\rho C$ is plotted whereby R is the acoustical resistance, $\rho$ is the average air density and C is the average sound speed. The curve a applies to a panel which has at the side of the passing air stream, that is, at the side of the sound source, cylindrical round perforations as illustrated in FIGS. 1 and 2. The line b applies to the embodiment according to the invention illustrated in FIGS. 3 and 4. The measurements are carried out with an upper sheet having a porosity of 4%, in other words the passages measured at their minimal diameter are covering 4% of the surface area of the sheet 14, whereby the passage density was approximately 2850 per cm$^2$. In practice the ultimate shape of the passages as well as the number of passages per surface area unit may depend on the particular sound situation.

Because the thickness of the front sheet 14 is, among other factors, determined by the inner shape of the passages and by the number of passages per surface area unit, the thickness of the sheet can, in correspondence with the attenuation requirements, be so thin that between the core 12 and the sheet 14 a further sustaining sheet may be added. Such a sustaining sheet has in general a relatively large porosity, so that it does not interfere with, nor detract from, the effectiveness of the invention.

We claim:

1. Sound attenuating structure including a core layer comprising hoenycomb shaped cells directed perpendicular to the main surface of the structure, a closed sheet at one side of said core layer and a perforated sheet at the other side of said core layer, at which side the sound waves impinge upon the structure, characterized in that the passages in said last mentioned sheet have a cross section presenting its smallest diameter somewhere within the sheet thickness of the structure and increasing from this diameter towards both surfaces of said sheet.

2. Sound attenuating structure including a core layer comprising honeycomb shaped cells directed perpendicular to the main surface of the structure, a closed sheet at one side of said core layer and a perforated sheet at the other side of said core layer, at which side the sound waves impinge upon the structure, characterized in that the passages in said last mentioned sheet have a cross section presenting its smallest diameter in that half of the layer thickness directed to the outside of the structure and increasing from this diameter towards both surfaces of said sheet.

3. Sound attenuating structure including a combination of a number of core layers comprising cells directed perpendicular to the main surface of the structure, which core layers are separated from each other by perforated separating sheets, a closed sheet at one side of said combination and a perforated sheet at the other side of said combination at which side the sound waves impinge upon the structure, characterized in that the passages in said last mentioned sheet as well as in the separating sheets have a cross section presenting its smallest diameter in that half of the structure directed to the outside of the structure and increasing from this diameter towards both surfaces of the respective sheet.

4. Sound attenuating structure according to claim 1, characterized in that viewed in the longitudinal passage direction said passages have a symmetrical or asymmetrical double conical cross section with fluent transition.

5. Sound attenuating structure according to claim 1, characterized in that in transversal direction said passages have a circular or approximately circular cross section.

* * * * *